March 29, 1960    O. DIETZSCH, SR., ET AL    2,930,115
METHOD OF PRODUCING A MODULAR BODY FOR
CONTROLLED MIXING OR EMISSION OF A
PLURALITY OF FLUIDS Filed Oct. 24, 1957      12 Sheets-Sheet 1

March 29, 1960    O. DIETZSCH, SR., ET AL    2,930,115
METHOD OF PRODUCING A MODULAR BODY FOR
CONTROLLED MIXING OR EMISSION OF A
PLURALITY OF FLUIDS
Filed Oct. 24, 1957      12 Sheets-Sheet 12

METHOD OF PRODUCING A MODULAR BODY FOR CONTROLLED MIXING OR EMISSION OF A PLURALITY OF FLUIDS

Otto Dietzsch, Sr., Wangen/Bodensee, Hans Joachim Dietzsch, Wiesbaden, and Otto Dietzsch, Jr., Wangen/Bodensee, Germany Application October 24, 1957, Serial No. 692,237

Claims priority, application Germany October 25, 1956

6 Claims. (Cl. 29—406)

The invention relates, summarily speaking, to the manufacture of multi-stage precision nozzles for controlled mixing or emission of at least two fluids. Such multi-stage nozzles are employed in many different arts. For example, they include fuel injection nozzles for internal combustion engines, dispersion nozzles for spray application of liquids, spinnerets, pneumatic feed devices for large-area films, and the like. An essential element of such a multi-stage nozzle is a modular body having a main and at least one auxiliary passage each in communication with a source of fluid supply and each having a requisite conformation as to cross section and mutual arrangement in order to release the several fluids, all or some of which may be present in a liquid or gaseous state of aggregation, from the nozzle orifice under preassigned operating conditions. In many such cases, extremely accurate cross-sectional shape of the cooperating nozzle orifices may be important, especially when, as for example in a spinneret, one of the emerging fluids is to become a continuous body in the solid state of aggregation.

Hence, particularly in the field of synthetic fiber manufacture, numerous proposals have been made for the production and conformation of multi-passage nozzles. A much used procedure consists in that the nozzle body is produced with the aid of an auxiliary material which, during one stage of the process of manufacture, or in other words temporarily, occupies the place of the future nozzle passages, and is removed in a subsequent operation, finally leaving the cross-section of passage open.

The present invention likewise makes use of temporary occupancy of the passage cross-sections by an auxiliary material, and discloses means of producing nozzle bodies to a high-precision reproducible pattern as to dimensions of both the body and the passages of the nozzle. Such precision of manufacture is necessary especially when a plurality of nozzles are to be operated jointly and must simultaneously emit equal quantities of fluids.

Accordingly, the invention relates to a method of manufacturing a modular body for controlled mixing or emission of several fluids, having a main and at least one auxiliary passage each in communication with a source of fluid supply and each having a requisite conformation as to cross section and mutual arrangement, with the aid of an auxiliary material temporarily occupying the passage space, and is characterized in that constituent material and auxiliary material are alternately applied in superimposed layers according to a regular, in particular symmetrical arrangement with respect to the centerline of the main passage, and in that, before each additional layer of one material is applied, the exterior surface of the last applied layer of the other material is modeled to a shape bearing a preassigned relationship to the requisite shape, for example identical with it, by means of tools oriented with respect to, in particular acting concentrically with, the centerline of the main passage; each intermediate configuration being provided, preferably at its ends, by removal of zones of auxiliary material, with bearing surfaces for the means of orienting, for example centering, such intermediate configuration with respect to the centerline of the main passage.

The essential novelty of the invention, therefore, consists in that wall surfaces of nozzle passages may be fashioned to their exact requisite shape by precision machining. This applies not only to axially parallel passage surfaces but also to any internal features such as connecting webs in the passage cross-section, and to axially straight and curved passages alike. The term "tools" as used in the description of the invention is to be understood to include all means of shaping the material to be worked, with or without removal of stock. In the first instance, therefore, tool bits, grinding tools and pressure-operated polishing tools may be used. Application of the individual layers of constituent and auxiliary material may likewise be accomplished in widely diverse ways. Metallic material may for example be applied by addition of molten stock, by galvanic deposition of metal, or, in particular in the case of thin layers, by known techniques of cathode disintegration and the like. Non-metallic materials may be applied from the fused state, from solution, or in particular from high-viscosity solutions.

In order to protect the surfaces produced by the operations described above, and forming the passage walls in the finished nozzle, from deformation in subsequent service, such passages liable to deformation, in particular auxiliary passages annularly surrounding a main passage, are provided with axially-spaced integral connecting webs and struts of constituent material between opposed wall surfaces. This is done, within the scope of the proposed process of manufacture, by completely removing the auxiliary material occupying the auxiliary passage in the place of such a web, and filling the resulting cavity with constituent material when applying the next layer thereof. Such connecting webs or struts serve not only for mechanical stiffening of the labyrinthine body, but also to control flow conditions in the fluid carried by the passage. In fuel mixer nozzles, for example, it is advantageous that the combustion air, or, particularly in multi-stage nozzles, a combustion gas mixture already charged with fuel, should be set in turbulent or preassigned non-axial, for example helical or tangential, motion. Such connecting webs or struts are therefore usually also modeled to a preassigned shape by precision shaping of the surfaces of auxiliary material temporarily enveloping them.

To protect precision nozzles produced according to the invention in particular against thermal deformation when installed for final service or when being combined into larger assemblies, the constituent material, in further elaboration of the invention, may be a metal, in particular nickel or chromium alloy, tungsten alloy or molybdenum, which, under the influence of heat, owing for example to soldering or welding operations, will not change its condition of hardness, or only slightly, thus retaining its shape. The auxiliary material used may, as suggested by way of example, comprise an organic substance at least plasticizable by heat or organic solvents, for example an unset synthetic. The latter material may optionally be set before precision shaping and thus rendered more workable as well as more retentive of shape, remembering of course that in the spirit of the invention such modified material must still be removable.

In nozzles of simple design, as for example with auxiliary passage concentrically surrounding the main passage, it may be possible to apply the auxiliary material in preformed condition, for example in the form of tubing, to a given intermediate configuration, shrinking the tubing on and then modeling its exterior surface to the requisite shape. If, as previously suggested, the constituent material is electrolytically or galvanically deposited, then in case an electrically non-conductive auxiliary material is used, at least the finished exterior surface of the layer of auxiliary material to be galvanized must be rendered electrically conductive.

Where constituent material is mentioned in contrast to auxiliary material in the foregoing, this is not to suggest that the substance of the body need consist of one and the same material throughout. Rather, the expression is intended to include composite layers of several constituent materials. For example, especially in the case of aggressive fluids, it will be expedient for the layer on the exposed passage wall to consist of a thin film of especially resistant material, for example iridium, and the rest of the mass of some other metal, for example nickel, this layer of nickel being again optionally coated with rare metal where it bounds upon the next passage.

Experience has shown that by the principle of the invention as explained above, it is possible to manufacture multi-stage nozzles having a requisite high-precision shape, in particular of passage cross-section, in indefinitely reproducible numbers. This applies not only to nozzles of comparatively large passage cross-section, as on the order of 1 mm. inside diameter, but also to extremely fine nozzles, as used for example in fusion-spinning of synthetics to produce textile fibers of smallest denier. For this purpose, nozzles may be used with passage cross-section on the order of $1/10$ mm. diameter. For such nozzles, machinery and tools of corresponding delicacy must be used, but in the inventor's experience this presents no insurmountable difficulty, particularly when the work is monitored by otherwise known techniques of precision mechanics, for example with the aid of microprojection means.

In developmental work on such micronozzles in particular, an especially advantageous mode of practicing the invention proved to be, in order to secure the requisite high-precision external shape of a layer, first to tool its exterior surface to a dimension below that of the requisite contour, to measure the resulting deficiency of stock, and to build up this deliberately undersized exterior surface with an additional coating of layer material bringing the dimension to nominal, by a method of application in which the measured defect can be used as a control factor for the thickness of the coating to be applied. As an example of such a method of application, continuous galvanizing may be mentioned, using the measured defect—with the aid of previous trial or calculation—as time factor. The point of this expedient is that the precision of conformation may be increased in the proportion borne by the deliberate deficiency to the total thickness of layer, because the tolerances of application and shaping become closer in that proportion. Such undersize correction may if necessary be carried out in several steps, forming several successively applied component coatings.

The tooling of the modular body at the ends to provide bearing surfaces, according to the invention, for means of orienting the body with respect to the centerline of the main passage so that the passage wall surfaces can be worked, may also be utilized, in further elaboration of the invention, to impart a special, for example highly polished, surface condition to the face of the nozzle. Such a highly polished face is essential, for example, in the production of hollow filaments of fusion-spun synthetic material, being not much wetted by the fused material and thus preventing collapse of the tube at the nozzle orifice. Quite in general, therefore, a preferred mode of practicing the method according to the invention consists in that, to make a distributor body with multi-stage nozzles, variously fed with liquid and with gaseous material, the nozzle face, at least in the area between a liquid and a gas orifice, is provided with a surface not readily wetted by the liquid, for example highly polished.

The invention further relates to the modular bodies produced by the method described above, for controlled mixing or emission of several fluids. They may be embodied in two different fundamental forms. The finished modular body may either comprise an integral material configuration, or consist of a plurality of components parts fitting into each other with extreme precision of centering.

A modular body of the former kind fashioned according to the invention for controlled mixing or emission of a plurality of fluids, with fluid passages oriented and in particular concentric with respect to each other, wherein at least the inner passage member is mounted in a partition at the fluid inlet end and intrudes centrally into an outer passage member at its fluid outlet end, is accordingly characterized in that the inner passage member, outer passage member and connecting centering webs comprise parts materially integral with each other, having a preassigned high-precision surface contour, and produced by alternate superapplication, in the preassigned axis of orientation, of layers of the constituent material and an auxiliary material temporarily occupying the passage space, and by intervening, optionally stepwise, finishing to gauge of each last-applied layer by means of tools centering upon the work at that stage.

A modular body of the second kind fashioned according to the invention for controlled mixing or emission of a plurality of fluids, with fluid passages oriented and in particular concentric with respect to each other, wherein at least the inner passage member is mounted in a partition at the fluid inlet end and intrudes centrally into an outer passage member at its fluid outlet end, is instead characterized in that the inner passage member and the outer passage member are separate parts having a high-precision surface contour and each consisting of a body produced by alternate superapplication, in the preassigned axis of orientation, of layers of the constituent material and an auxiliary material temporarily occupying the passage space, and by intervening, optionally stepwise, finishing to gauge of each last-applied layer by means of tools centering upon the work at that stage.

By the term "surfaces," implying extremely high-precision shape in the spirit of the invention, are meant all boundaries of inner passage or outer passage members that affect the size of the nozzle passages and their mutual arrangement. Hence if, according to a preferred embodiment of the invention, the outer passage member is in turn a separate part insertable in the front plate of a spinneret, then the exterior surface of that part determining its seating in the plate may likewise be meant. It is likewise within the scope of the invention for centering webs, in particular integral with the outer passage member, to be likewise produced by building up of layers with surface finishing by means of tools centering upon the work.

The two fundamental types of modular body above described for controlled mixing or emission of a plurality of fluids according to the present invention differ, briefly speaking, in that the former is in one piece, to be handled as a permanent unit once manufactured, requiring to be installed, removed, and cleaned as such, while the latter consists of two or, in the case of multiple nozzles, a correspondingly larger number of separate parts, which may be inserted in each other on assembly and disassembled again, for example for cleaning. As against known disassemblable spinnerets, however, the second form of the invention is differentiated by the fact that every surface determining the nozzle cross-section, including every interior surface, has been finished to gauge by the method according to the present invention as above described, for example by machining.

The novel method of production permits quantity manufacture of parts having exactly the same dimensions and consequently interchangeable for the required righ-precision nozzles, since manufacturing tolerances can be kept extremely close. Proper high-precision mutual arrangement of nested nozzle parts is facilitated by making the inner passage member in the form of a configuration substantially longer than and often several times as long as the outer passage member, and having a small cross-section, for example a fine tube anchored in a partition placed at a suitable distance from the nozzle orifice. Nozzle inserts in the form of long solid rods are known. It is the idea of the invention, however, in particular to provide a temporary and removable spacing layer between the inner passage and outer passage members. This spacing layer may for example comprise an extremely thin coat of organic material capable of being eliminated by the action of heat. Alternatively, however, the spacing layer, though very thin, may be made of a thickness exceeding the tolerance, and replaced after removal, in particular on the inner passage member, by an equally thick layer of constituent material. If this layer is produced by a method of application in which the thickness of the layer to be applied, as is the case for example in a continuous galvanizing process, depends on a time factor, the final surface contour may be brought to gauge within extremely close manufacturing tolerances.

Alternatively, however, the space left clear by removal of the spacing layer may be filled on the principle of taper fitting. This may preferably be done in the course of building up the layers, in particular on the inner passage member, at an offset along the axis of orientation relative to the temporary spacing layer, by providing a layer of equal thickness and so adapting the end dimensions of the inner passage and outer passage members that after removal of the temporary spacing layer and axial displacement of the two parts relative to each other, the replacing layer will occupy the room of the temporary spacing layer. The substrate for the temporary spacing layer and the exterior surface of the replacing layer may preferably be congruently tapered.

Some embodiments of the invention will now be described in more detail with reference to the accompanying drawings, wherein.

In all the figures, the constituent material forming the permanent nozzle components has been indicated by shading lines declining to the right, and the auxiliary material present only temporarily during the process of manufacture by shading lines declining to the left.

In the methods illustrated by Figs. 1 to 35 for producing a modular body in one piece, the process is begun by reducing a short piece of aluminum wire 1, for example on a draw bench, to the exact cross-section that the ultimate main passage of the nozzle is to have. On this wire 1, a layer of nickel 2 is electrolytically deposited in such thickness that the outer diameter will be greater than the requisite inside diameter of the future auxiliary passage.

Figure 1:
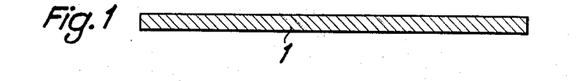
Figs. 1 to 12 show successive states of completion of a two-stage nozzle body with annular auxiliary passage axially symmetrical to the main passage.
Figure 2:
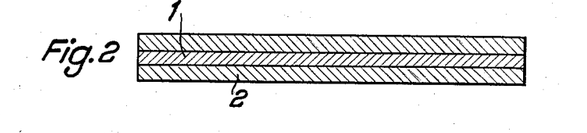
Figure 3:
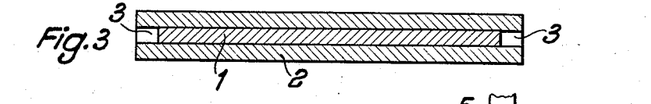
Figure 4:
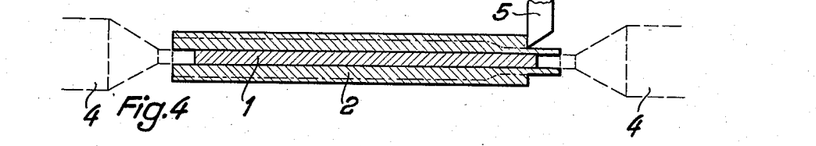
Figure 5:
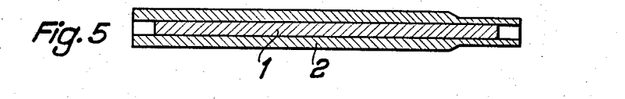
Figure 6:
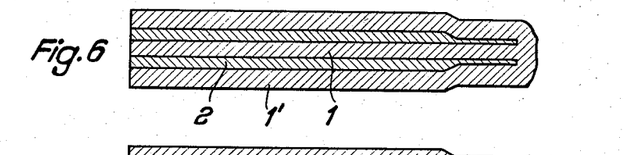
Figure 7:
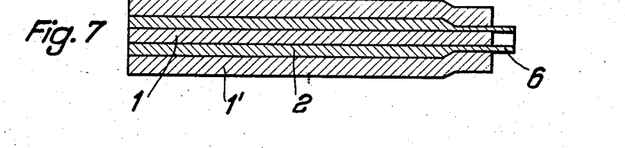
Figures 8, 9:
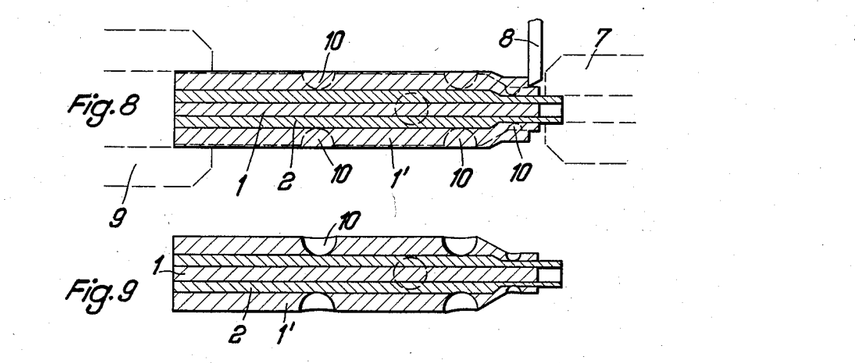

Next, by partial removal of auxiliary material 1 at the two ends of the wire, recesses 3 are produced to receive the centers 4 of a machine tool and the work is set up in the machine as indicated schematically in Fig. 4. By means of a tool 5, for example a tool bit, the exterior surface of the work is now turned off to the profile indicated by dotted lines, producing the intermediate form represented in Fig. 5, where the tube of nickel has a taper shoulder near the right-hand end. This intermediate form is embedded, for example by electrolytic disposition, with a layer of auxiliary material 1', likewise refilling the recesses 3, see Fig. 6. The thickness of the auxiliary material is made greater than would correspond to the interior space of the future auxiliary passage. In the next operation, the freshly applied auxiliary material 1' is removed at the end on the right in Fig. 7 over such a length as to expose a portion 6 of the nickel tube 2 to serve as a center hold for the fixture 7 (see Fig. 8) in the next operation, performed with tool 8. Since in electrolytic deposition the thickness of the second layer 1' of auxiliary material increases practically uniformly, its exterior surface may serve as a bearing for the chuck 9 at the left-hand end of the work. Alternatively, however, this surface may of course first be finished to greater precision. In Fig. 8, dotted lines again show where and to what extent the auxiliary material is to be machined away, giving the work the shape shown in Fig. 9. At the points 10 represented by a full circle and semicircles, the outer layer of auxiliary material is locally removed entirely, so as to expose and preferably also somewhat indent the surface of the nickel tube 2 itself at these points.

Figure 10:
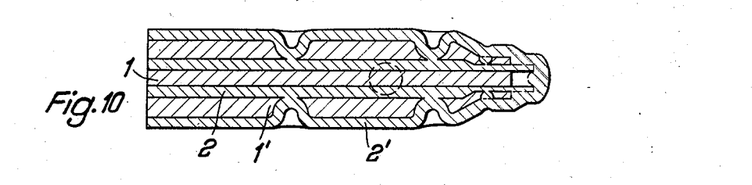
Figure 11:
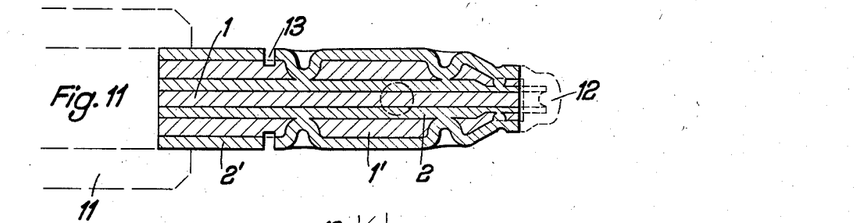
Figure 12:
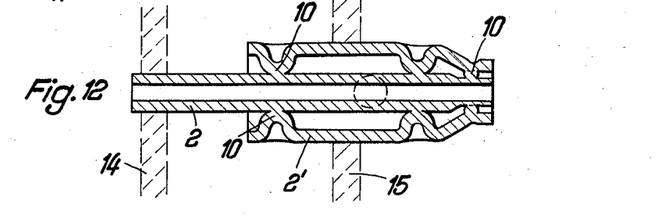
Figure 13:
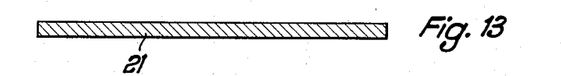
Figs. 13 to 22 show successive states of completion of another two-stage nozzle body, but with a spacious auxiliary passage occupied by guide surfaces and with the nozzle orifice of the main passage set back relative to that of the auxiliary passage.
Figure 14:
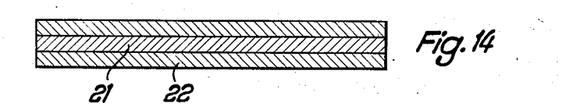
Figure 15:
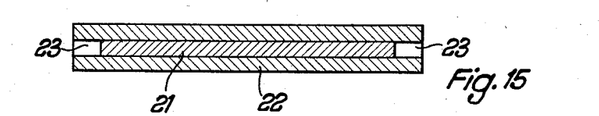
Figure 16:
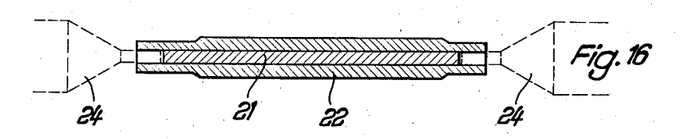
Figure 17:
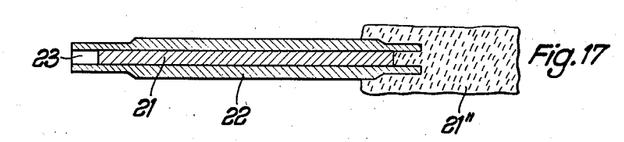
Figure 18:
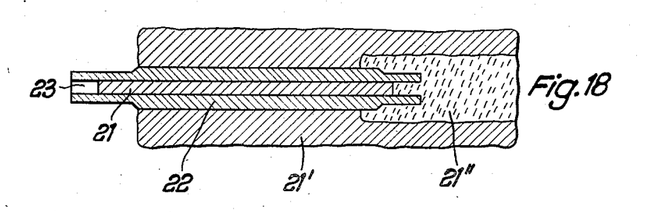
Figure 19:
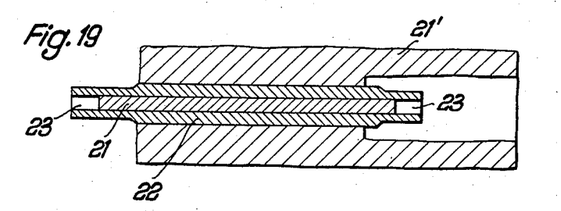

The work thus completed is then enveloped in another layer of nickel 2', producing the configuration shown in Fig. 10. This piece is mounted without special centering means in a chuck 11 and its end portion 12 is removed with a facing tool, adding a notch 13 perforating the outer layer of nickel 2'. It is then placed in a bath to dissolve or etch out the layers of auxiliary material 1 and 1'. This finally produces the finished two-stage nozzle of Fig. 12, having a main passage formed by the central tube 2 and an annular auxiliary passage formed by the outer tube 2'. The main and auxiliary passages are integrally joined locally at points 10. This nozzle may be installed in a support with suitable partitions 14 and 15.

The electrolytic application of metal is accomplished by otherwise known means, for example in a revolving drum containing a large number of nozzle blanks.

Figure 22:
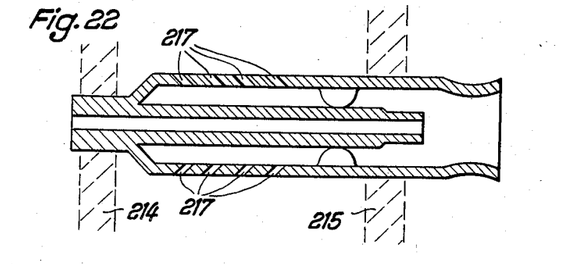

In similar manner to that explained above with reference to Figs. 1 to 12, a nozzle of the form illustrated in Fig. 22 may be constructed. This will now be briefly explained with reference to Figs. 13 to 22, in which the same or similar parts are designated by the same reference numerals with the digit 2 prefixed.

The starting material again comprises a wire-like piece of auxiliary material 21 brought to correct cross-sectional size and covered with a nickel layer 22 of greater thickness than to gauge. As in the first example, partial removal of auxiliary material at the ends at 23 provides recesses for centering means 24 of a machine tool, and the blank is finished to the external shape shown in Fig. 16. Then—in departure from the first example—the finished blank is first covered with one auxiliary substance 21″ at the right-hand end in Fig. 17, and then, to the inclusion of this auxiliary substance 21″, with an ampler thick layer of the original other auxiliary material 21′, producing the configuration illustrated in Fig. 18. Then the former auxiliary substance 21″ is dissolved out, producing the blank shown in Fig. 19, where on the right the nickel tube 22 projects into the interior of the cup-shaped outer body 21′ consisting of the original auxiliary material. The two ends of the nickel tube 22 with centering recesses 23 are now placed between centers 27 and 29 of a lathe or the like, and the outer portion 21′ is machined with a tool, not shown, precisely to the external shape indicated by dotted lines. Indentations 210 are so arranged and shaped as to form the negative of aerodynamic vanes or baffles.

Figure 20:
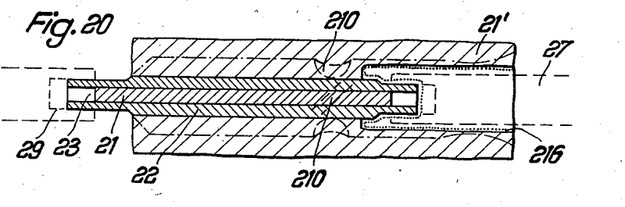
Figure 21:
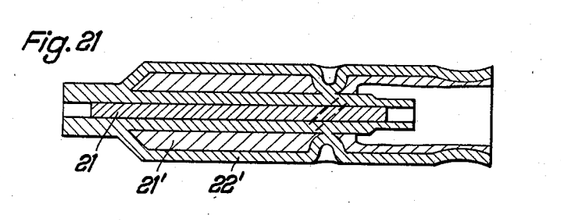

The work, thus finished on the outside, is removed from the lathe and the entire inside wall of the cup-shaped portion is covered with a coat of masking lacquer 216, represented by dots in Fig. 20. The left-hand centering recess 23 is similarly filled with lacquer. Then the work is placed in a nickel-plating bath and covered all over with a layer of nickel 22′ of preassigned thickness, producing the piece shown in Fig. 21. The last steps consist in removal of the auxiliary material 21 and 21′ and in the provision of openings 217 in the outside wall of the nozzle chamber at the left in Fig. 22. When such a nozzle is installed in a support with partitions 214, 215 as indicated in Fig. 22, the central, main passage is in communication with the space to the left of partition 214, and the large annular outside passage is in communication via apertures 217 with the propellant chamber between partitions 214, 215. Such a nozzle configuration may for example serve as a combustion-gas emission nozzle, the fuel being supplied through the central main passage and the combustion air through the annular passage. The previously mentioned connecting webs 210 (Fig. 20), as aforesaid, serve as vanes to impart a turbulence favoring thorough mixture of fuel to the combustion air admitted.

Still another embodiment of the invention will now be described with reference to Figs. 23 to 35. This is to be a nozzle with main passage issuant from the side wall of the nozzle body. In this series of figures, parts analogous to parts described in the first example are designated by the same reference numerals with the digit 3 prefixed.

Figure 23:
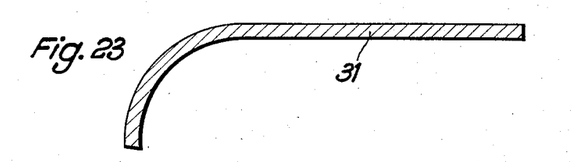
Figs. 23 to 35 show successive states of completion of still another embodiment of a two-stage nozzle body with lateral entry of the central nozzle tube into a larger nozzle passage.
Figures 24, 25:
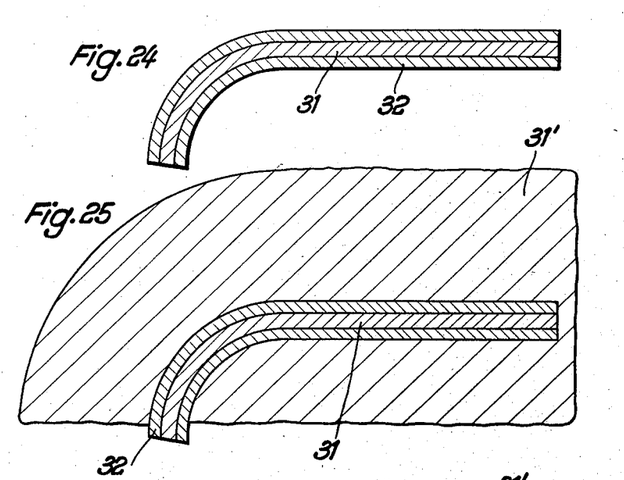
Figure 26:
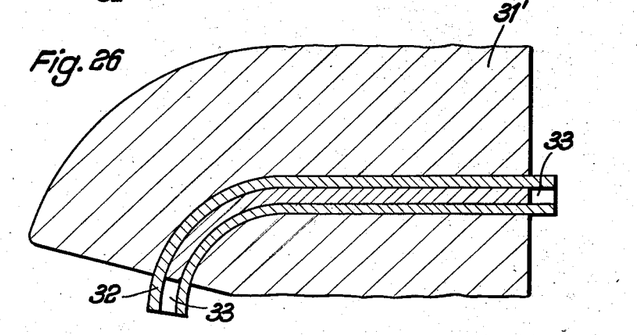
Figure 27:
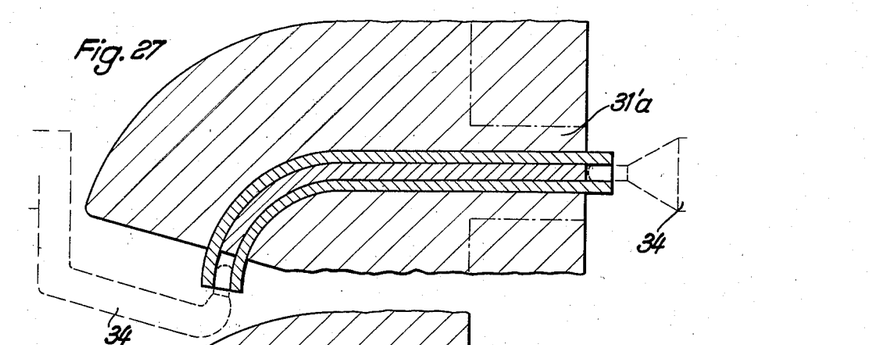
Figure 28:
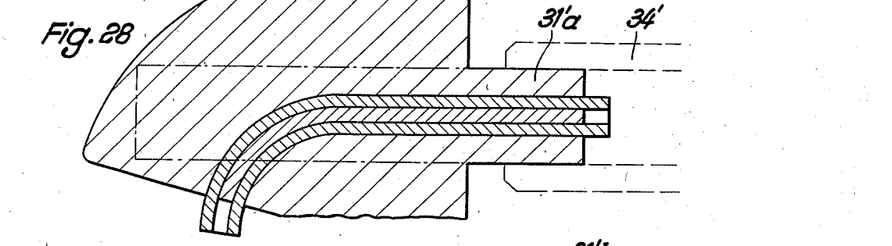
Figures 29, 30:
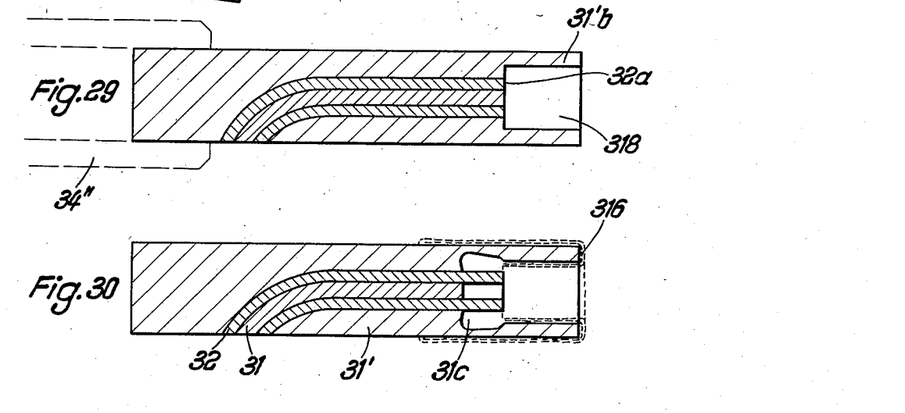
Figure 31:
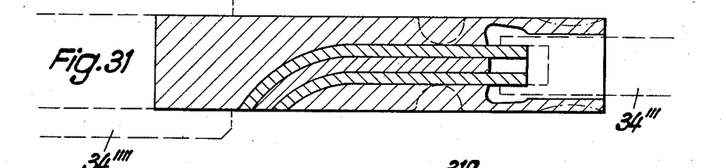
Figure 32:
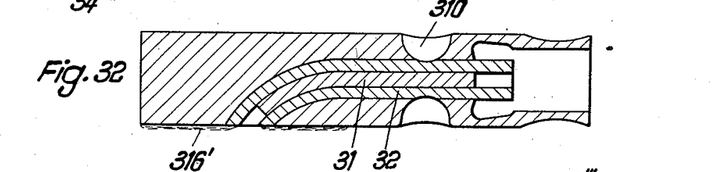
Figure 33:
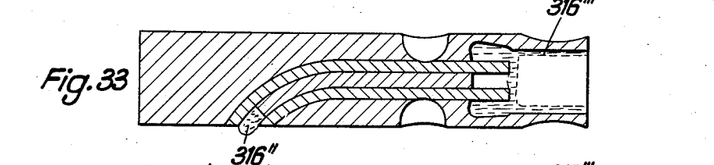
Figure 34:
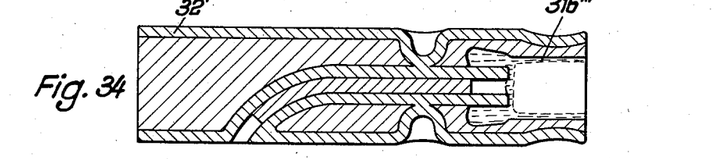
Figure 35:
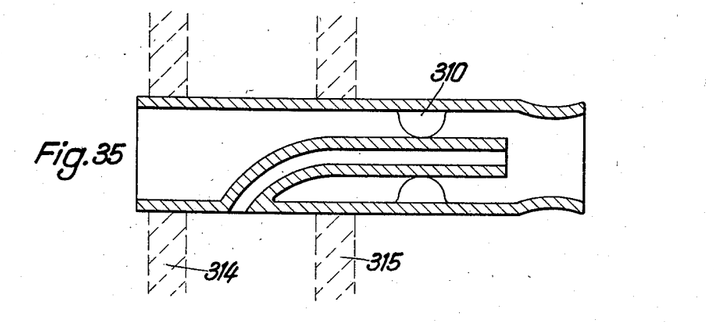
Figure 36:
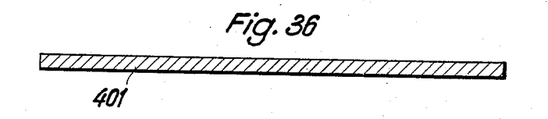
Figs. 36 to 40 show successive states of completion of a hollow core for a modular body with the features of the present invention, in longitudinal section.
Figure 37:
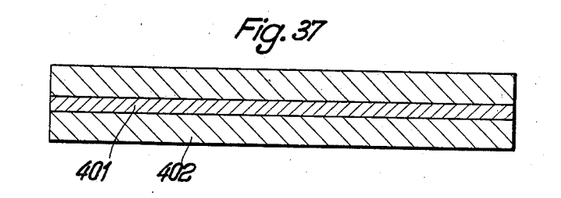
Figure 38:
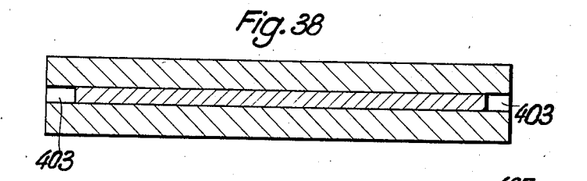

Conformably to the bowed shape of the main nozzle passage, the initial piece of auxiliary material is in this case a bent wire 31, see Fig. 23, which is first covered with a layer of nickel 32, the outside dimensions of this layer of nickel not requiring extreme precision. The resulting composite wire is imbedded in a comparatively thick-walled block 31′ of the first auxiliary material, or enveloped in it, and the auxiliary material is removed in the same manner as previously described to such an extent that the composite body 31, 32 will project somewhat at both ends, with centering recesses 33. By means of these, the blank is held by fixtures 34 of a lathe or the like, and, in one operation, cut back sufficiently, say along the dot-dashed lines in Fig. 27, to provide a better centering hold 31′a, by means of which the work, after reversing, can be held by a sufficiently large chuck 34′ and reduced to the outside shape represented by dot-dashed lines in Fig. 28. The work is then again reversed for mounting by its left-hand end in a chuck 34″, and is recessed at the right-hand end at 318 in Fig. 29, finishing the face 32a of the future main nozzle tube, and the inside contour 31′b of recess 318 as a centering surface. This contour 31′b, the right-hand face and a portion of the exterior surface of the blank are now masked with a protective coat 316, as shown dotted in Fig. 30, resistant to a solvent or corrosive for the auxiliary material 31′, which latter is then dissolved out at 31c in the vicinity of the nozzle orifice 32a sufficiently for the nozzle orifice 32a to become a freely projecting tube section. Then the coat of lacquer 316 is removed, the work is placed between centers 34‴ and 34⁗, and machined as before to the external shape indicated in Fig. 31 and represented in Fig. 32, again making room for connecting webs 310 in the shape of vanes. Using a local temporary masking coat 316′, auxiliary material 31 is then dissolved out to some extent at the left-hand end of the main tube 32 and the resulting recess filled with a plug or masking coat 316″ obstructing access of electrolyte. With a similar masking coat 316‴, all exposed surfaces including nozzle orifice 32 in the vicinity of the right-hand recess 318 are also covered. The piece, thus locally protected, is then covered electrolytically with a layer of nickel 32′, see Fig. 34, and finally, by removing auxiliary material 31, 31′ and masking layers 316″, 316‴, converted into the nozzle configuration illustrated in Fig. 35, which may be installed in a support with partitions 314, 315. This nozzle may likewise serve for example as a fuel dispersion nozzle. The difference from the embodiment of Fig. 22 consists in that the outer chamber is wide open at the left and projects into the space to the left of partition 314, while the central nozzle communicates with the space between partitions 314 and 315; whereas in the nozzle of Fig. 22 the connections of the two passages with the outside were precisely the reverse.

All nozzle wall surfaces having a requisite high-precision shape, i.e. principally the inside walls of nozzle passages, are brought to gauge step by step in the manner generally described above.

Now, referring to Figs. 36 to 57, the production of the other, or multipartite, type of modular body according to the invention to be discussed.

(1) Formation of inner passage member

Figure 39:
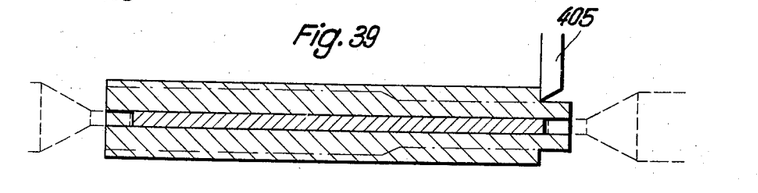

A piece of wire 401, for example of silver, is drawn to the precise cross-section required for the ultimate inner passage of the nozzle. Upon this wire 401, a layer of gold 402 is electrolytically deposited in such thickness as to exceed the requisite size of the annular passage in the finished nozzle. Then, by partial removal of auxiliary material 401, recesses 403 are made at the ends of the resulting composite wire for the centers of a machine tool, and the wire is set in the machine as schematically indicated in Fig. 39.

Figure 40:
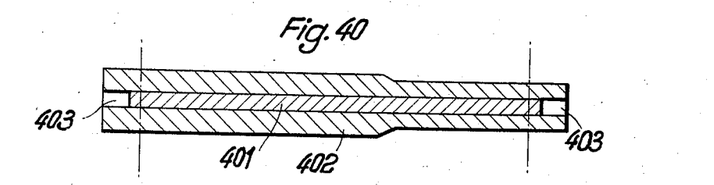

By means of a tool 405, for example a tool bit, the exterior surface of the composite wire is now machined down to the profile indicated by dot-dashed lines, producing the part shown in Fig. 40, having the gold tube provided with a taper shoulder towards the right-hand side of the drawing. This piece, finally, is cut down, by removal of the centering ends, to the length required for insertion in the complete nozzle body.

(2) Formation of outer passage member

Figure 41:
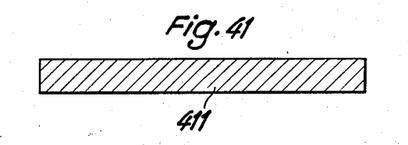
Figs. 41 to 51 show successive states of completion of the outer portion of a modular body with the features of the present invention, in longitudinal section, Fig. 46 showing a cross section along the line a—a in Fig. 45.

A piece of wire 411, not substantially longer than the outer passage member, and consisting of galvanizable metal, is drawn to a cross-section approaching that of the inner passage member to be inserted later, but of somewhat smaller diameter. Upon this piece of wire 411 thus finished, a layer 412 of extremely hard metal, for example iridium, is electrolytically deposited in such thickness that the total cross-section of the composite wire is equal to that of the inner passage member to be inserted.

Figure 42:
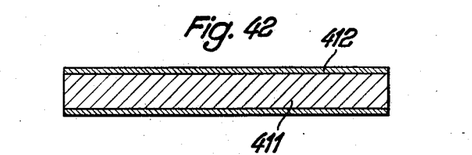
Figure 43:
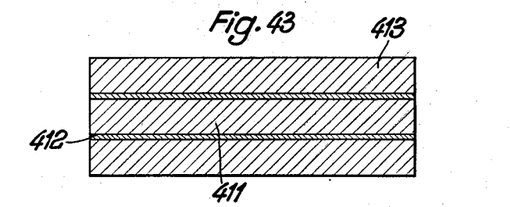
Figure 44:
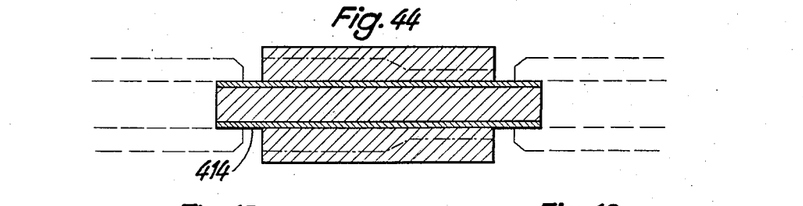
Figures 45, 46:
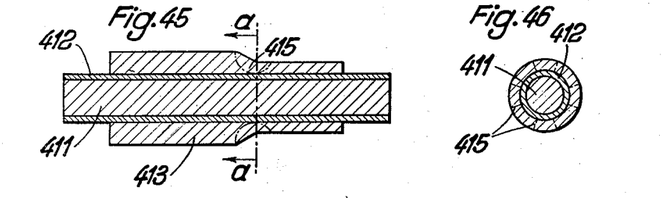

Then, preferably electrolytically, this composite wire is covered with an auxiliary material 413, for example silver, in such thickness that the resulting cylinder has an outside diameter greater than the interior size of the outside passage of the finished nozzle. This cylinder is set in a lathe with the aid of exposed centering projections 414 and machined in two ways:

First its exterior surface is brought exactly to the intended shape and dimensions of the interior wall of the outer passage member. Then axial lengthwise grooves 415 are cut into the silver layer 413 from the outside, with boundaries having the shape of centering flukes for the inner passage member to be inserted. Since such centering flukes will not ordinarily extend as far as the inner member over the entire length of the passage, but will become more shallow towards the ends of the passage, the grooves 415 will accordingly reach the hard iridium layer 412 only in the mid-length portion of the cylinder, where the depth of penetration of the tool will be automatically limited by the hardness of the iridium layer. The depth of groove in this portion will thus necessarily correspond to the fluke depth where the inner passage member is to be centered.

Figure 47:
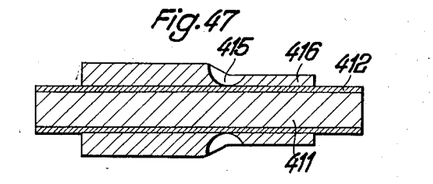

The metal cylinder is again coated with nozzle material 416, for example gold, preferably by electrolytic means, until the grooves are completely filled and the cylinder has grown to a diameter exceeding the requisite diameter of the finished outside passage member.

Figure 48:
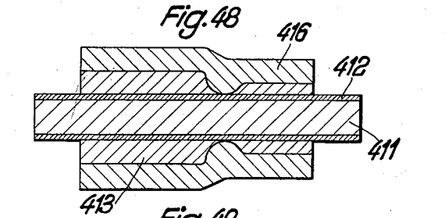
Figure 49:
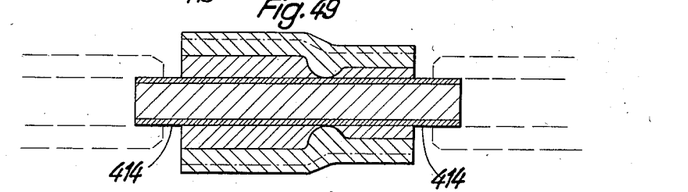
Figure 50:
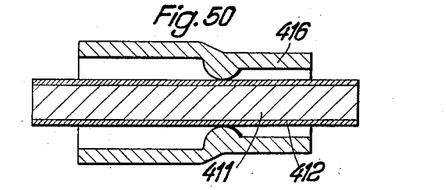
Figure 51:
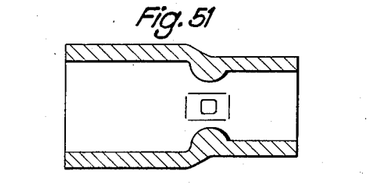

Then the gold-sheathed cylinder is again machined on the lathe to the requisite gauge of the outer passage member with the aid of centering projections 414. Finally the auxiliary material 413, in particular silver, is removed by chemical corrosion. Since the gold, in electrolytic deposition, will not adhere to the iridium layer, the iridium-clad core 411, 412 will simply be a close fit in the gold part 416 over a short axial distance after removal of the silver, and can therefore be withdrawn without substantial mechanical exertion.

The resulting outer-passage member (Fig. 51) is exact to gauge all over.

(3) Simultaneous formation of inner-passage and outer-passage members

Figure 52:
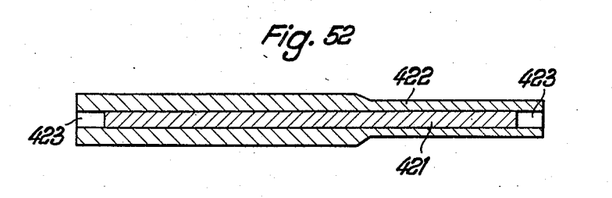
Figs. 52–54 show some early states of completion of still another embodiment of a modular body with the features of the present invention.
Figure 53:
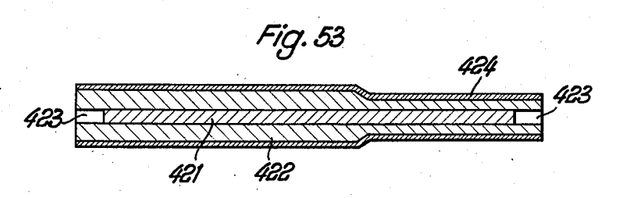
Figure 54:
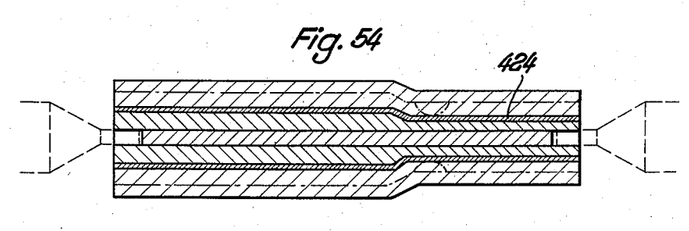

First, in the manner described in Example 1, a composite wire 422, 421 of gold with silver core 421 is prepared, of thickness exceeding the requisite inside diameter of the outer passage of the finished nozzle. After providing recesses 423 for the centers of a machine tool, the composite wire is machined down to an outside diameter very slightly smaller than the requisite inside diameter of the outer passage. The deficiency of thickness is accurately measured. Then the composite wire 422, 421 is electrolytically coated with a layer 424 of extremely hard metal, for example iridium. The previously ascertained deficiency is then used as a time factor in the electrolysis, at the end of which the iridium layer will therefore have the exact diameter to gauge.

This three-component wire with silver inside, then gold, and iridium on the outside, is now used after the manner of Example 2 as a core for electrolytic build-up of the outer-passage member. The auxiliary material applied, for example silver as before, is further processed as described in Example 2 to form the ultimate outer-passage member.

Obviously, in place of the manufacturing operations explicitly mentioned above, others may be used. Instead of electrolytic deposition, other known modes of application of matter may be used, as for example building-up of fused material, cathode disintegration etc.; instead of metallic materials, non-metallic materials may be used, in particular thermosetting plastics, especially as auxiliary materials. Such synthetics may be applied in the fused state or from high-viscosity solutions. Alternatively, pre-formed stock may be used, and shrunk on in known manner. The essential point in every instance is that an outer layer faithfully conforms to the surface of a preceding layer, previously brought to gauge, and can in turn be provided with exterior surfaces corresponding to the requisite shape.

While in the foregoing there has been explicit mention only of bipartite nozzles consisting of an inner-passage and an outer-passage member, of course the invention is not confined to such comparatively simple types. Nozzles with more than two stages may be produced on the same principles. It is also possible, in the case of disassemblable modular bodies, to arrange centering arms on an annular insert fitting closely in the outer part of the nozzle. Since it is possible, according to the invention, to work to idefinitely close tolerances, such further subdivision of the nozzle will not impair precision. Even in the manufacture of unfavorable shapes, a surface may be brought to gauge by correcting a minus error progressively through formation of several successively applied component coatings each closer to the requisite size than the preceding. The point of this expedient, as aforementioned, is that the precision of conformation may be stepped up in the proportion of the deliberate minus error to the total thickness of layer, because the build-up and removal tolerances become closer correspondingly. This may preferably be done after the manner of application of the iridium coating to the core as described in Example 2.

Figure 55:
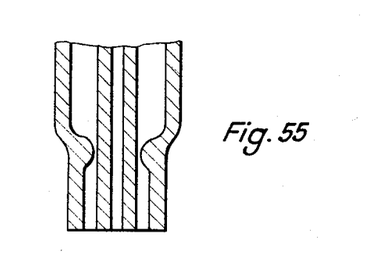
Fig. 55 shows a longitudinal section of another embodiment of a modular body with dynamically centered hollow core.
Figure 56:
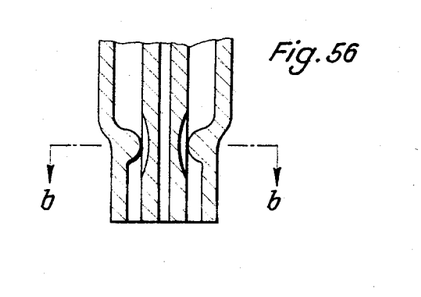
Fig. 56 shows still another embodiment of a modular body with dynamically centered hollow core; and, Fig. 57 shows a cross section of the body along the line b—b in Fig. 56.
Figure 57:
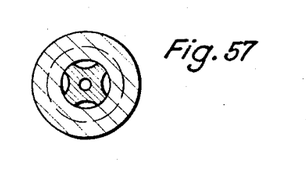

The method hereinbefore described may also be used to make high-precision nozzle components that are not to be in close contact with neighboring elements, but are to be dynamically centered by the flow of a fluid, for example at a passage constriction, where extreme surface uniformity will of course be critical, see Figs. 55 to 57.

The integral centering webs on the inner tube may alternatively be produced by subsequent working of the surface.

We claim:

1. A method of producing a modular body for a controlled mixing and emission of a plurality of fluids, the body having a main and at least one auxiliary passage each adapted for communication with a source of fluid and each having a requisite conformation as to cross-section and mutual arrangement, the method comprising the steps of forming the cross-section of a core of an auxiliary material to the exact shape of the main passage, depositing on said exactly shaped core a layer of material for constituting the modular body, machining sections of the resulting body to form centering surfaces for centering means, shaping the exterior surface of said layer to the exact shape of the radially inner wall of the auxiliary passage and coaxial with a center line provided by said centering means, depositing on the exactly shaped surface an auxiliary layer of an auxiliary material, bringing the exterior surface of said auxiliary layer to the exact shape of the radially outer wall of the auxiliary passage, depositing on said exactly shaped surface a further layer of material and removing all of said auxiliary material to provide the main and auxiliary passages.

2. A method according to claim 1, further comprising removing material from said layer of auxiliary material temporarily forming an auxiliary passage to form axially spaced cavities, the bottoms whereof end at said exterior surface, and filling said cavities by the material constituting the modular body to form integral connecting webs between the opposite wall surfaces.

3. A method according to claim 1, wherein the deposition of the outer layers is performed by an electrolytic process.

4. A method according to claim 1, comprising an additional step whereby the exterior surface of any layer of constituent material after having been brought to the prescribed exact shape and before being covered with a radially outer layer of auxiliary material is covered with an extremely thin temporary separating layer preventing the webs of the next radially outer layer of constituent material from integrating with the said first layer of constituent material.

5. A method according to claim 1, comprising forming said exterior surface dimension below desired gauge, measuring the resulting deficiency in size, and covering the undersized exterior surface with a deposit of the layer material to bring the size to gauge by deposition in which the measured minus error serves as control factor for the thickness of the supplemental deposit.

6. A method according to claim 5, wherein the supplemental deposit is formed by an electrolytic process of which the time of operation is controlled in accordance with said measured minus error.

References Cited in the file of this patent

UNITED STATES PATENTS

| | | | |
|---|---|---|---|
| Re. 20,425 | Schori | | June 22, 1937 |
| 1,634,274 | Smith | | July 5, 1927 |
| 1,646,602 | Smith | | Oct. 25, 1927 |
| 2,254,757 | Smith | | Sept. 2, 1941 |
| 2,592,614 | Stoddard | | Apr. 15, 1952 |
| 2,641,439 | Williams | | June 9, 1953 |
| 2,726,118 | Jones | | Dec. 6, 1955 |
| 2,825,543 | McCracken | | Mar. 4, 1958 |